(12) United States Patent
LeVine et al.

(10) Patent No.: US 6,591,379 B1
(45) Date of Patent: Jul. 8, 2003

(54) METHOD AND SYSTEM FOR INJECTING AN EXCEPTION TO RECOVER UNSAVED DATA

(75) Inventors: Eric A. LeVine, Seattle, WA (US); Kirk A. Glerum, Redmond, WA (US); Matthew J. Ruhlen, Redmond, WA (US); Michael R. Marcelais, Redmond, WA (US); Jeff David Mitchell, Waterloo (CA); Steven Miles Greenberg, Hastings-on-Hudson, NY (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 09/602,051

(22) Filed: Jun. 23, 2000

(51) Int. Cl.[7] .................................................. H02H 3/05
(52) U.S. Cl. ........................................... 714/38; 714/15
(58) Field of Search .............................. 714/38, 15, 16, 714/20, 37, 39; 717/124, 127, 128, 129

(56) References Cited

U.S. PATENT DOCUMENTS

| | | | | |
|---|---|---|---|---|
| 4,352,157 A | * | 9/1982 | Namimoto et al. | 711/202 |
| 5,684,986 A | * | 11/1997 | Moertl et al. | 707/101 |
| 6,009,258 A | * | 12/1999 | Elliott | 703/22 |
| 6,263,489 B1 | * | 7/2001 | Olsen et al. | 717/129 |
| 6,434,741 B1 | * | 8/2002 | Mirani et al. | 717/124 |

* cited by examiner

Primary Examiner—Dieu-Minh Le
(74) Attorney, Agent, or Firm—John E. Whitaker; Merchant & Gould (57) ABSTRACT

A method and system for injecting an exception into a hung program module to recover unsaved data. The method and system allows a user to determine that the program module is hung and inject an exception into the hung program module. In response to the injected exception, program code, within the program module, is activated to detect the crash and launch a failure reporting executable program that instructs the hung program module to execute its data recovery program. The file recovery program recovers the unsaved data and notifies the failure reporting executable program when it has completed the data recovery. Once the failure reporting executable program receives the notification, it will instruct the operating system to restart the program module. The restarted program module then displays a user interface with a list of the unsaved data that were recovered. The user interface also provides controls for a user to select, from the list of recovered data, the data that the program module will keep.

20 Claims, 5 Drawing Sheets

METHOD AND SYSTEM FOR INJECTING AN EXCEPTION TO RECOVER UNSAVED DATA

TECHNICAL FIELD

This invention relates to software program modules. More particularly, this invention relates to a method and system for injecting an exception into a program module to recover unsaved data.

BACKGROUND OF THE INVENTION

Despite the best efforts of software developers, software programs inevitably fail at one time or another. One type of failure that a software program can encounter is a hang. A hang occurs when a program module is running and results in the suspension of the operation of the program module. Basically, a hang occurs when a program module is stuck in a loop of code that it cannot get out of for whatever reasons. Hangs are frustrating to users and, in some cases, may cause the user to lose work in the form of unsaved data.

In the past, users coped with hangs by spending hours on the phone with program support services personnel and/or rebooting the computer that was running the hung program module. The user's decision to reboot usually occurred after the user tried, to no avail, to get the application program to respond to user input.

Furthermore, operating systems, such as Windows NT and Windows 95/98, provide users with a user interface for determining if an application is hung (not responding) or running. Through the user interface, a user is able to command the operating system to terminate a running or hung application program.

Although the above methods provide means for a user to bring an application program out of a hung state, they do not provide a solution for recovering unsaved data from a hung program module. Usually, unsaved data is lost, when the computer is rebooted or the program module is terminated through the operating system.

More closely related to the problem of recovering unsaved files from a hung application is the tool called DOTCRASH.exe (Dotcrash). Dotcrash is published by MSPress, available since 1999, and only operates with the Windows NT operating system. Dotcrash uses the Windows NT API CreateRemoteThread to induce an exception into a hung process. Further, Dotcrash may be used in conjunction with a Just-In-Time (JIT) debugger for the purpose of gathering crash dumps from a crash reporting executable. Crash dumps, while sometimes useful to software developers in debugging their programs, are not helpful to users in recovering unsaved data. Dotcrash is further unsuitable to the needs of unsaved data recovery as it fails to induce an exception on the main thread of the program. There are cases, such as OLE data objects, where the data recovery code must run on the thread that created the OLE data objects in order to recover as much of the unsaved data as possible.

Thus, there is a need to be able to induce an exception on the main thread of the hung application in order for that thread to execute special purpose data recovery code. There is a further need for a method and system for inducing any directed execution in a hung application on Windows 95/98 to provide capabilities for the purposes of data recovery parallel to those offered by CreateRemoteThread on Windows NT.

There is a further need for the induced crash to be intercepted, through the use of exception handling, so the user can be offered the opportunity to recover their unsaved data and initiate crash reporting.

SUMMARY OF THE INVENTION

The present invention satisfies the needs described above by providing a method and system for inducing an exception into a program module that is hung. In one embodiment, the present invention is a user-launched program module that allows a user to intentionally initiate an exception in a program module that is hung or not responding to the operating system. The user intentionally induces an exception into the program module to recover any data that was not saved prior to the hang. For the purpose of this discussion, an exception is a problem or change in running conditions that causes the operating system to crash or interrupt the hung program module.

The present invention comprises a program module, a hang manager program module, and an executable crash reporting program. A user, who believes that the program module is hung or not responding, can use the hang manager program module to inject an exception into the program module. At this time, the user may have the option of recovering unsaved data.

After the user commands the hang manager program module to inject the exception, the hang manager program module creates system kernel objects that are used to record the fact that the hang manager program module caused the crash. Then, in the case of Windows NT based O/S's, the hang manager program module creates a second thread and initiates its execution in the program module, or, in the case of Windows 9x based O/S's, the hang manager triggers the execution of a second thread that was created when the program module started up.

Next, this second thread instructs the operating system to stop executing the main thread in the program module. Once the main thread stops, the second thread determines the next instruction that the main thread would execute if active, and the memory address of that instruction. The second thread also saves the next instruction in a data block before changing the next instruction to an operating code that the processor defines as an illegal instruction. The next instruction is saved so that it later can be restored to the main thread. Finally, the second thread instructs the operating system to restart the main thread, thereby causing the main thread to execute the illegal instruction and create an exception in the program module.

In response to this exception, the operating system redirects the main thread to execute previously registered exception handling code within the program module. This exception handling code launches a crash reporting executable. The crash reporting executable checks for the existence of the kernel objects which the hang manager program module created, to determine if the exception was caused by the hang manager program module rather than an exception caused through normal execution which would be handled differently. The crash reporting executable will display a user interface to inform the user of the problem and to provide options specific to the program module. The user interface also includes an option to report the problem to a local or remote server. If the user chooses to report the problem that caused the hang, after the unsaved data is recovered, the crash reporting executable reports information regarding the nature of the hang to the local or remote server, which may prove useful to developers attempting to fix the problem.

If the user chose to recover unsaved data with the hang manager program module, the crash reporting executable will notify the program module to start its data recovery code. When the data recovery code has recovered the unsaved data, the data recovery code notifies the crash reporting executable that the recovery is complete. At this point, the crash reporting executable restarts the program module. The restarted program module displays to the user, through a user interface, the data that has been recovered with the data recovery code.

These and other features, advantages, and aspects of the present invention may be more clearly understood and appreciated from a review of the following detailed description of the disclosed embodiments and by reference to the appended drawings and claims.

DETAILED DESCRIPTION

The present invention is directed to a method and system for inducing an exception into a hung program module. A hang occurs when a program module is stuck in a loop of code that it cannot get out of for whatever reason. Hangs are frustrating to users and, in some cases, may cause the user to lose work in unsaved data.

The present invention is a user-launched program module that allows a user to intentionally inject an exception into a program module that is hung or not responding to the operating system. The user intentionally induces this exception into the program module to recover any data that was unsaved prior to the hang or to have an opportunity to report the hang.

In one embodiment, the invention is incorporated into the "OFFICE" program module, manufactured and sold by Microsoft Corporation of Redmond, Wash. Briefly described, the "OFFICE" program module is a suite of word processing, spreadsheet, presentation, database, and time management application programs along with program modules that integrate and enhance these application programs. While the invention will be described in the general context of the "OFFICE" program module running in conjunction with a personal computer, those skilled in the art will recognize that the invention also may be implemented in combination with other program modules.

Having briefly described an embodiment of the present invention, an illustrative operating environment for the present invention is described below.

Illustrative Operating Environment

Referring now to the drawings, in which like numerals represent like elements throughout the several figures, aspects of the present invention and the illustrative operating environment will be described.

Figure 1:
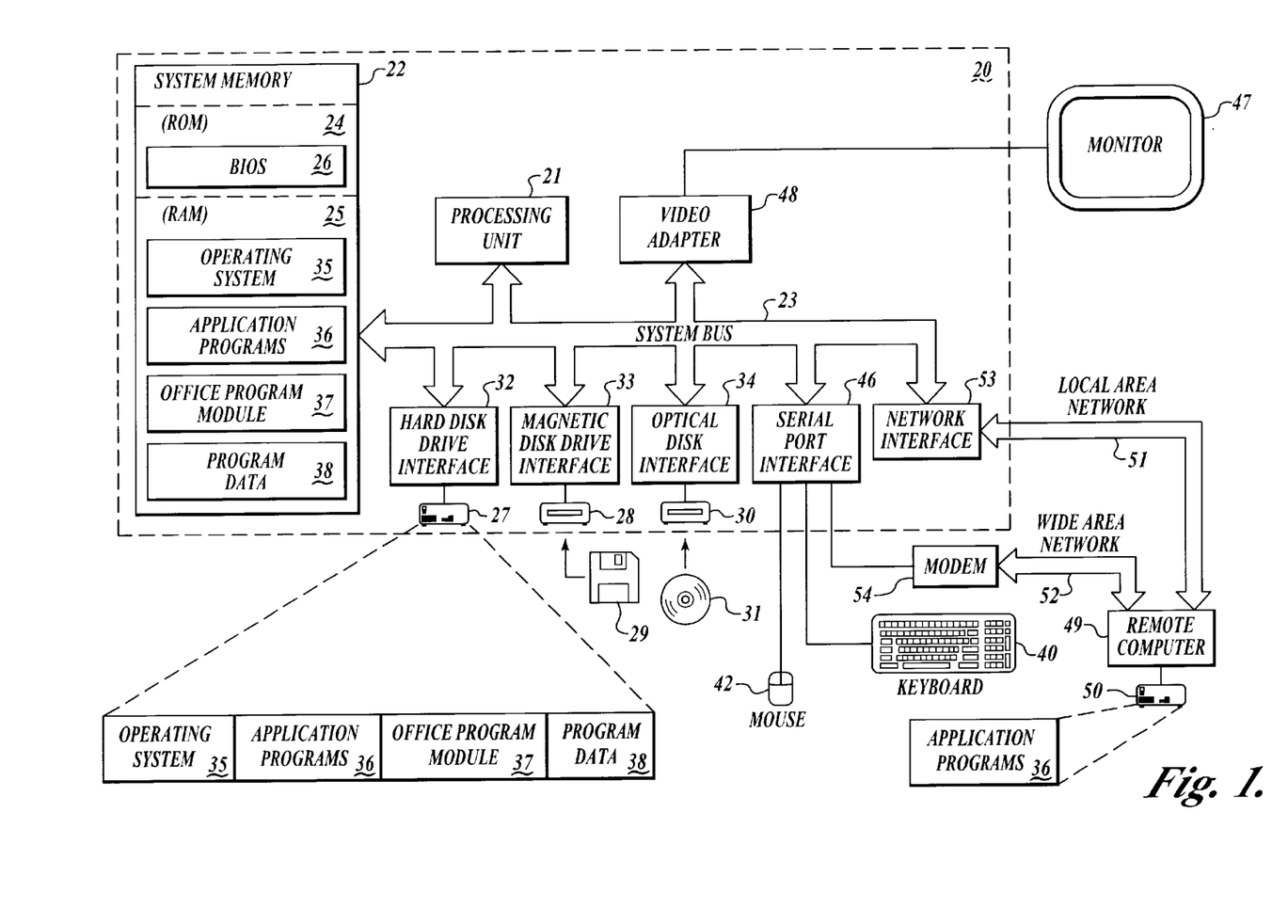
FIG. 1 is a block diagram of a computer that provides the illustrative operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an illustrative system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the illustrative operating environment.

A number of program modules may be stored in the drives and RAM 25, including an operating system 35, one or more application programs 36, an "OFFICE" program module 37, program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are illustrative and other means of establishing a communications link between the computers may be used.

System for Injecting an Exception and Recovering Unsaved Data

In one embodiment, the present invention is a user-launched program module that allows a user to intentionally inject an exception into a program module that is hung or otherwise not responding to the operating system. The user intentionally induces an exception into the program module to recover any data that was not saved prior to the hang. In other words, the present invention allows the user to convert a hang, which the program module cannot handle, into an exception, which the program module can handle.

Figure 2:
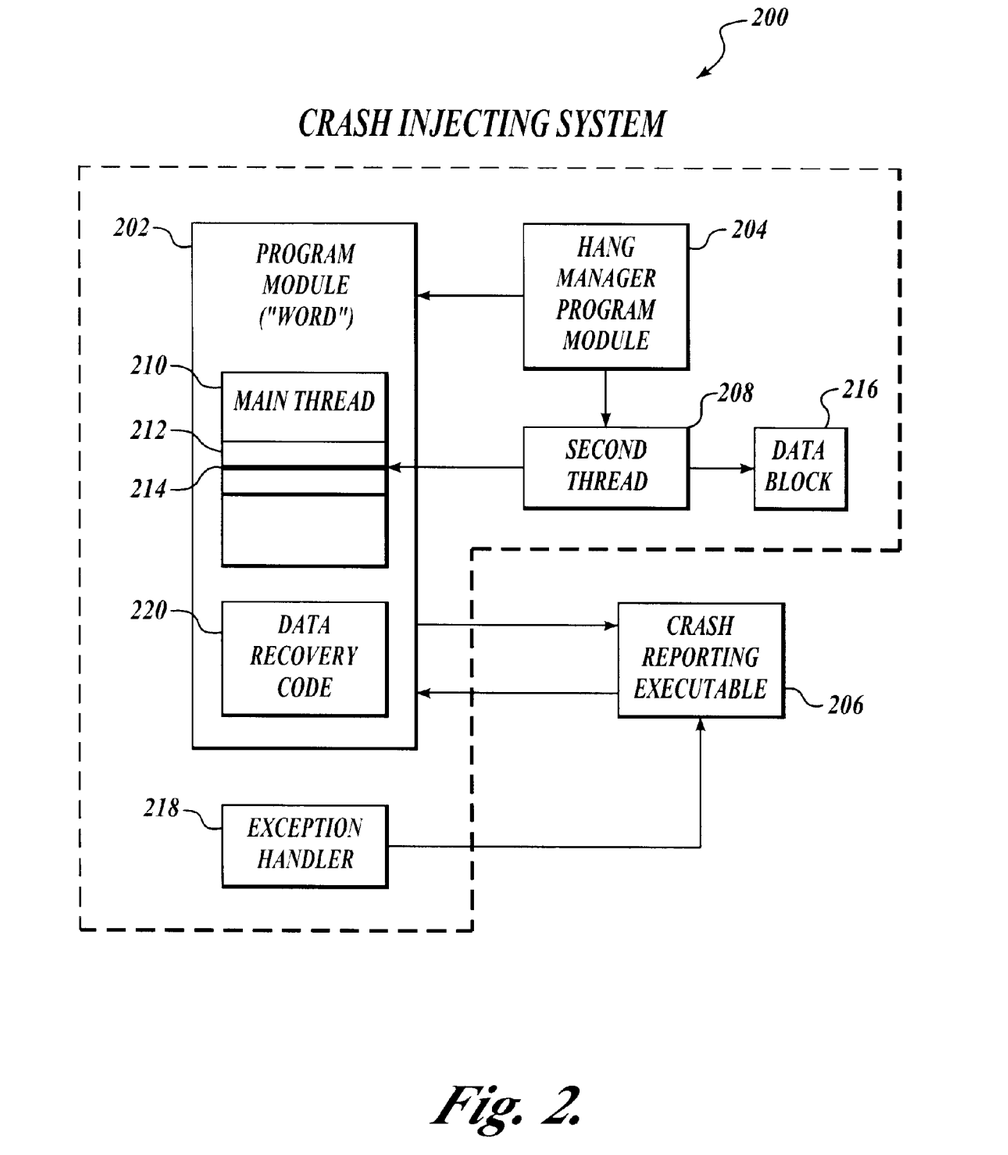
FIG. 2 is a component block diagram of an illustrative system for injecting an exception into a program module in accordance with an embodiment of the present invention.

Referring now to FIG. 2, a component block diagram of an illustrative system 200 for injecting an exception and recovering unsaved data in accordance with an embodiment of the present invention will be described. The system 200 comprises a program module 202. For example, program module 202 may be the "WORD" word processor program module, manufactured and sold by Microsoft Corporation of Redmond, Washington and included in the "OFFICE" 37 (FIG. 1) suite of program modules. The system 200 of the present invention also comprises a hang manager program module 204 and a crash reporting executable 206.

The present invention allows a user that believes that the program module 202 is hung or not responding to the operating system to inject an exception into the program module 202. To inject the exception, the user must launch the hang manager program module 204. The hang manager program module 204 is launched by running an executable program. An executable program is a program that runs and typically means a compiled program translated into machine code in a format that can be loaded into memory and runs on a computer's processor.

Figure 3:
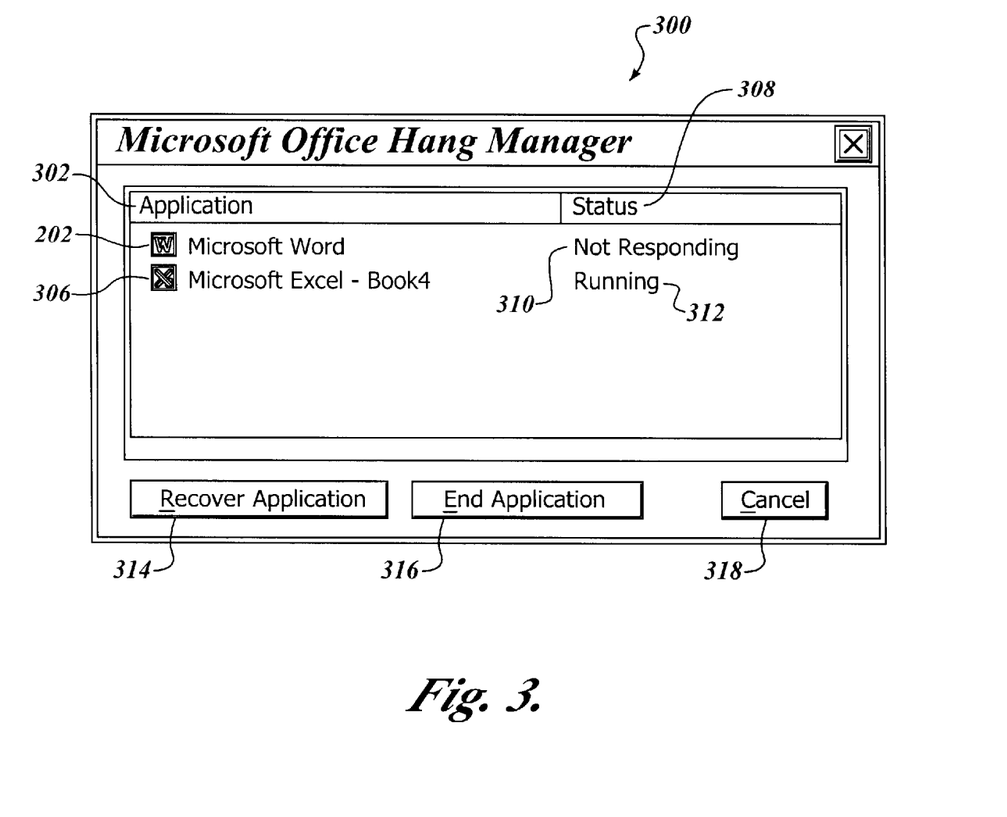
FIG. 3 is a screen shot illustrating the user interface of the hang manager program module of the present invention.

Once the hang manager program module 204 is launched, the user is shown a user interface 300 (FIG. 3). The user interface 300 displays the applications 302 that are running in the "OFFICE" 37 (FIG. 1) suite of program modules. The user interface 300 also displays the status 308 of the program modules. For example, FIG. 3 shows that Microsoft Word 202 is not responding 310 and Microsoft Excel 306 is running 312 in the "OFFICE" 37 suite of program modules. The hang manager program module 204 gets its status 308 information from the operating system application program interfaces (APIs). In an embodiment of the present invention, the operating system is the "Windows 98" operating system manufactured and sold by the Microsoft Corporation of Redmond, Wash.

The operating system APIs can determine the status of the program module 202 because the APIs keep track of the last time that the program module 202 queried its message queue. The program module's message queue stores user events, such as the user's key inputs. If the application has not queried its message queue within a predetermined time period, the operating system considers the program module as not responding. The program module 202 is not considered as not responding simply because the user is not providing input. As long as program module 202 queries its message queue, the program module 202 is considered to be responding.

After the user is shown the list of applications 302 and status 308 information, the user selects an application (202 or 306) and either the recover application button 314, the end application button 316, or the cancel button 318. If the user selects the cancel button 318, the user interface 300 is closed, and the hang manager program module 204 is deactivated. If the user selects the end application button 316, the selected application (202 or 306) is terminated and the unsaved data is not recovered. If the user selects the recover application button 314, the hang manager program module 204 injects an exception into the selected application (202 or 306).

Having described the user interface 300 for injecting an exception in accordance with an embodiment of the present invention, reference is made back to FIG. 2 to describe, in detail, the process used in inducing an exception into program module 202 and recovering the unsaved data.

After the user commands the hang manager program module 204 to inject the exception, the hang manager program module 204 creates the system kernel objects that are used to record the fact that the hang manager program module 204 caused the exception. Then, the hang manager program module 204 creates a second thread 208 in the program module 202 or triggers the continued execution of a second thread 208 that was created, in anticipation of the call, at the start up of the program module 202. For example, if the program module 202 is operating under the Windows NT operating system, then the hang manager program 204 injects the second thread 208. However, if the program module 202 is operating under the Windows 95/98 operating system, then the hang manager program module triggers the continued execution of the second thread 208 created at the start up of the program module 202.

Next, the second thread 208 instructs the operating system to stop executing the main thread 210 in the program module 202. Once the main thread 210 is stopped, the second thread 208 determines the next instruction 214, in loop 212, that the main thread 210 would execute if active, and the memory address of that instruction 214. The second thread 208 also saves the next instruction 214 in data block 216 before changing the next instruction 214 to an operating code that the processor defines as an illegal instruction. The next instruction 214 is saved so that it can later be restored to the main thread 210. Finally, the second thread 208 instructs the operating system to restart the main thread 210, thereby causing the main thread 210 to execute the illegal instruction and generate an exception in program module 202.

In response to the received exception, the exception handling code 218 is activated to catch the exception and launch a crash reporting executable 206. The crash reporting executable 206 determines if the hang manager program module 204 caused the exception by looking at the system kernel objects that the hang manager program module 204 created. The crash reporting executable 206 also displays a user interface to ask the user if they wish to report the hang. If the user chooses to report the problem that caused the hang, after the unsaved data is recovered, the crash reporting executable 206 determines the location of the crash and sends the location information to the local or remote server.

Since the user chose to recover the unsaved data while in the user interface 300 (FIG. 3), the crash reporting executable 206 will notify the program module 202 to start its data recovery code 220. When the data recovery code 220 has saved the unsaved data, it notifies the crash reporting executable 206 that the save is complete. At this point, the crash reporting executable 206 restarts the program module 202. The restarted program module 202 displays to the user, through a user interface, the data that has been recovered with the data recovery code 220. The user, then, selects from the displayed data the data that the program module 202 will retain.

Methods for Injecting an Exception and Recovering Unsaved Data

Having described the system 200 for injecting a crash into an program module 202 in accordance with an embodiment of the present invention, illustrative methods of carrying out the invention will be described in FIGS. 4 and 5.

Figure 4:
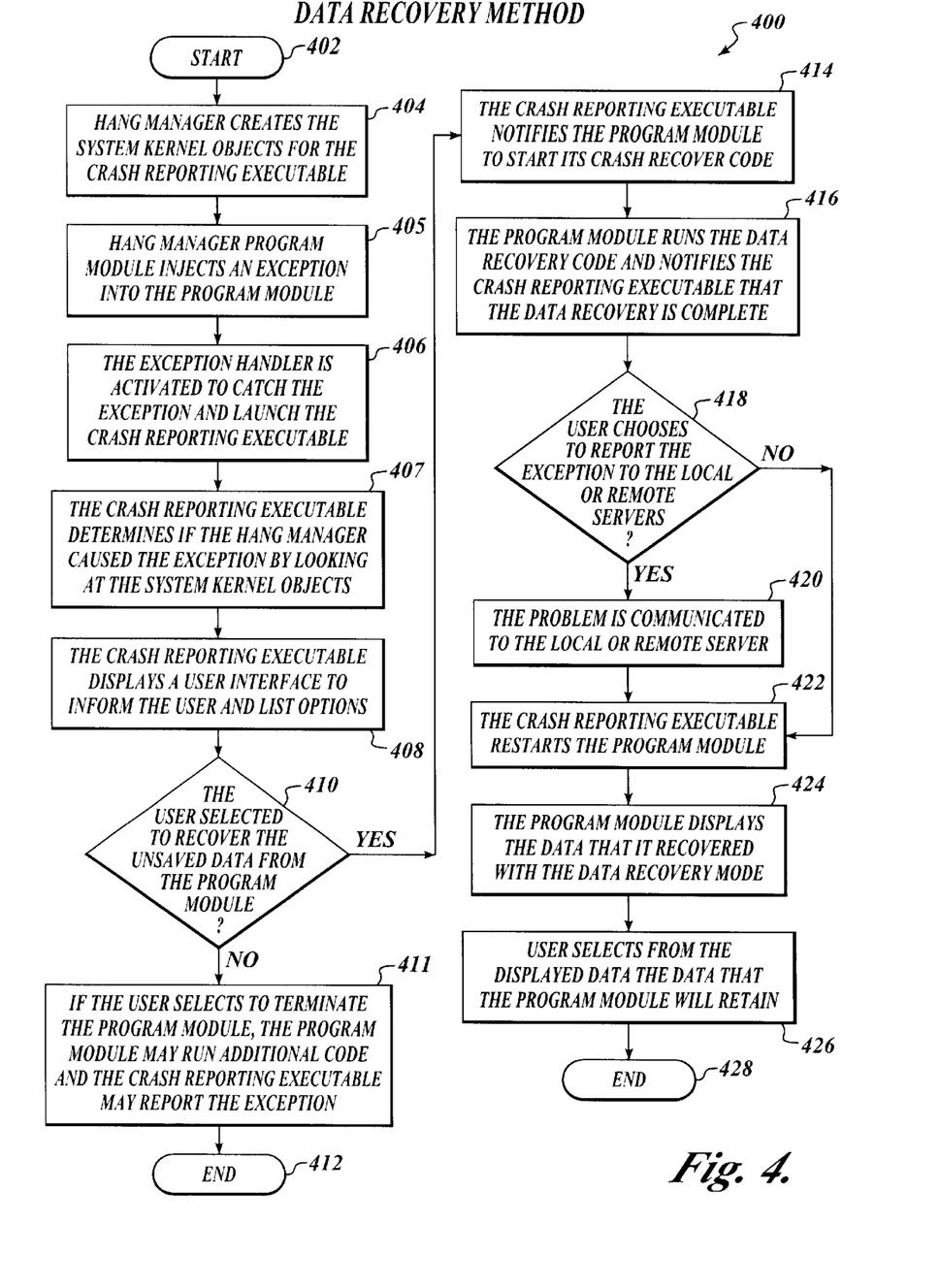
FIG. 4 is a flow diagram illustrating the data recovery method in accordance with an embodiment of the present invention.

FIG. 4 is a flow diagram illustrating an illustrative Data Recover Method 400 for recovering unsaved data from hung applications. The illustrative method 400 will be described below with reference to the elements of system 200 (FIG. 2).

The Data Recovery Method 400 begins at start step 402 and proceeds to step 404, where the hang manager program module 204 creates the system kernel objects for the crash reporting executable program 206. Next, the method 400 proceeds to step 405. At step 405, the hang manager program module 204 injects the exception into the program module 202.

In response to the hang manager program module 204 injecting the exception into the program module 202, at step 406, the exception handler 218 is activated to catch the exception and launch the crash reporting executable 206. Once the crash reporting executable is activated, at step 407, the crash reporting executable 206 looks at the system kernel objects created in step 404 to determine if the hang manager program module 204 caused the exception. Then, at step 408, the crash reporting executable 206 displays a user interface. The user interface provides the option to report the problem to a local or remote server.

The method 400 then proceeds to decision block 410. At decision block 410, the method determines if the user, while in the user interface 300 (FIG. 3), decided to recover the unsaved data from the program module 202. If the user did not decided to recover the unsaved data from the program module 202, then the method proceeds to step 411. At step 411, if the user selected to terminate program module 202, the program module 202 may choose to run additional code. In this case, the program module will be notified of the termination just as in the recovery case, but the data recovery code 220 will not run. The crash reporting executable 206 will still report the exception if the user chooses to report the exception. Next, the method proceeds to step 412 and ends.

However, if the user decided to recover the unsaved data within user interface 300 (FIG. 3), then method 400 proceeds to step 414. At step 414, the crash reporting executable 206 notifies the program module 202 to start its data recovery code 220. Next, at step 416, the program module 202 runs the data recovery code 220 and notifies the crash reporting executable 206 that the data recovery is complete.

Once the crash reporting executable 206 receives the notification that the data recovery is complete, method 400 proceeds to decision block 418. At decision block 418, the method determines if the user chose to report the problem to the local or remote server at step 408. If the user chose to report the problem, the method 400 proceeds to step 420. At step 420, the crash reporting executable 206 determines the location of the problem and communicates the location information to the local or remote server. Then, the method 400 proceeds to step 422.

However, if the user, at step 408, decided not to report the problem to the local or remote server, the method 400 proceeds to step 422. Regardless of whether or not the user decides to report the problem to the local or remote server, the method 400 proceeds to step 422. At step 422, the crash reporting executable 206 restarts the program module 202.

After the program module 202 is restarted, the method 400 proceeds to step 424. At step 424, the program module 202 displays, through a user interface, the data that it recovered using its data recovery code 220. Next, at step 426, the user selects, from the displayed data, the data that the program module 202 will retain. Then, the method 400 proceeds to step 428 and ends.

Figure 5:
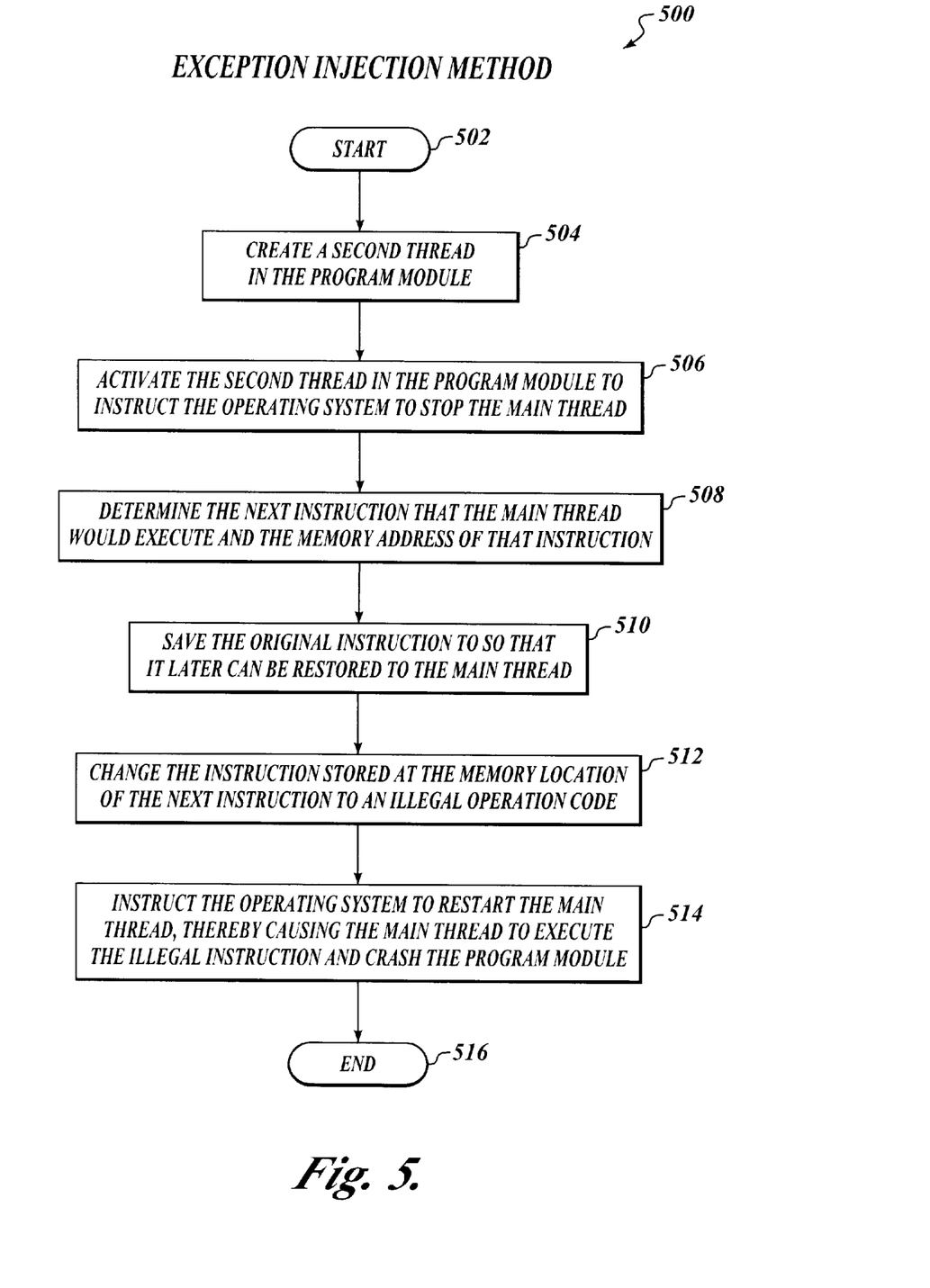
FIG. 5 is a flow diagram illustrating the exception injection method in accordance with an embodiment of the present invention.

FIG. 5 is a flow diagram showing an illustrative Exception Injection Method 500 for injecting an exception into a hung program module as set forth in step 406 in FIG. 4. The illustrative method 500 will be described below with reference to the elements of system 200 (FIG. 2).

The method 500 begins at step 502 and proceeds to step 504. At step 504, a second thread 208 is created in the program module 202 or a second thread 208 is called. For example, if the program module 202 is operating under the Windows NT operating system then the hang manager program module 204 creates the second thread 208. However, if the program module 202 is operating under the Windows 95/98 operating system, then the second thread 208 is created at the start up of the program module 202 and then waits for a signal from the hang manager program module 204 to activate.

The method 500 then proceeds to step 506. At step 506, the second thread 208 is activated and instructs the operating system to stop the main thread 210 from running in the program module 202. Next, at step 508, the second thread 208 determines the next instruction 214 that the main thread 210 would execute if active, and the memory address of that instruction. The method 500 then proceeds to step 510. At step 510, the next instruction 214 is saved so that it could later be restored to the main thread 210. At step 512, the second thread 208 changes the instruction stored at the memory location of the next instruction 214 to the operation code that the processor defines as an illegal instruction.

Finally, at step 514, the second thread 208 instructs the operating system to restart the main thread 210, thereby causing the main thread 210 to execute the illegal instruction and trigger an exception within the program module 202. Then, the method 500 proceeds to step 516 and ends.

Although the present invention has been described above as implemented in a preferred program module, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A method for injecting an exception into a program module that is hung and recovering unsaved data, the method comprising the steps of:

determining that the program module is hung;

in response to determining that the program module is hung, allowing a user to launch a second program to inject an exception into the program module;

activating program code, in response to the exception that was injected, that detects the crash and launches a crash reporting executable program that instructs the program module to execute data recovery routines;

recovering the unsaved data with the data recovery routines and notifying the failure reporting executable program when the data recovery routines have completed the recovery of the unsaved data;

in response to the failure reporting executable program receiving the notification, restarting the program module and displaying a user interface with the unsaved data that was recovered; and providing controls in the user interface for the user to select, from the unsaved data that was recovered, the data that the program module will recover.

2. The method of claim 1, wherein the second program is a user launched application program.

3. The method of claim 1, wherein injecting the exception into the program module further comprises the steps of:

displaying a plurality of program modules that are operating on a computer system;

determining and indicating a status for each of the plurality of program modules on the computer system;

selecting a program module from the plurality of program modules into which the crash is injected.

4. The method of claim 3, wherein determining the status of each of the plurality of program modules includes calling a system's application program interfaces to determine if each of the plurality of program modules is active.

5. The method of claim 3, wherein injecting the exception into the program module further comprises the steps of:

creating a second thread in the program module;

activating the second thread to instruct an operating system to stop executing a main thread running in the program module;

determining a next instruction that the main thread would execute if running in the program module;

saving the next instruction so that it later can be restored to the main thread;

changing an instruction stored at a memory location of the next instruction to an operation code that a processor defines as an illegal instruction;

instructing the operating system to restart the main thread, thereby causing the main thread to generate an exception within the program module.

6. The method of claim 5, wherein the program module creates the second thread, at startup, in anticipation of the second program requiring the second thread, the activation of which the second program can trigger.

7. The method of claim 5, wherein the second thread is created by the second program that injects the crash into the program module.

8. A system for injecting a crash into a hung program module and recovering unsaved data, the system comprising:

a hang manager program module to inject an exception into the hung program module;

a failure reporting executable program that in response to the exception injected by the hang manager program module instructs the program module to recover the unsaved data;

a data recovery routine that the program module executes, in response to instruction from the hang manager program module, to recover the unsaved data; a user interface, containing a list of the unsaved data that was recovered, that is displayed after the crash reporting executable program receives notification from the data recovery program that the recovery of the unsaved data is complete; and a plurality of controls in the user interface for a user to select, from the unsaved data that was recovered, the unsaved data that the program module will recover.

9. The system of claim 8, wherein the hang manager program is a user launched application program.

10. The system of claim 8, wherein the hang manager program module allows the user to inject the exception into the hung program module by providing a user interface.

11. The system of claim 10, wherein the user interface displays a plurality of program modules that are operating on a computer system, provides indication of the status of each of the plurality of program modules, and allows the user to select one of the plurality of program modules into which the exception will be injected.

12. The system of claim 11, wherein the hang manager provides indication of the status of each of the plurality of program modules by calling system application program interfaces to determine if the program module is active.

13. The system of claim 8, wherein injecting the exception into the program module includes:

a second thread that is activated in the program module for:

instructing an operating system to stop executing a main thread running in the program module, determining an instruction that is a next instruction that the main thread would execute if running in the program module, saving the next instruction so that it later can be restored to the main thread, changing the instruction stored at a memory location of the next instruction to an operation code that a processor defines as an illegal instruction, and instructing the operating system to restart the main thread, thereby causing the main thread to generate an exception in the program module.

14. The system of claim 13, wherein the hang manager program module creates the second thread.

15. The system of claim 13, wherein the program module creates the second thread, at startup, in anticipation of the hang manager program module requiring the second thread.

16. A computer readable-media on which is stored a program for injecting an exception into a hung program module to recover unsaved data, the program comprising instructions that when executed perform the steps of:

creating a second thread in the hung program module;

activating the second thread to instruct an operating system to stop executing a main thread running in the hung program module;

determining the next instruction that the main thread would execute if running in the hung program module;

saving the next instruction so that it later can be restored to the main thread;

changing the instruction stored at a memory location of the next instruction to a operation code that a processor defines as an illegal instruction;

instructing the operating system to restart the main thread, thereby causing the main thread to generate an exception in the hung program module.

17. The computer-readable medium as recited in claim 16, wherein the program provides a user interface for:

displaying a plurality of program modules that are operating on a computer system;

displaying a status for each of the plurality of program modules on the computer system; and selecting a program module from the plurality of program modules into which the exception is injected.

18. The computer-readable medium as recited in claim 17, wherein displaying the status of each of the plurality of program modules includes calling a system's application program interfaces to determine if each of the plurality of program modules is active.

19. The computer-readable medium as recited in claim 16, wherein the hung program module creates the second thread.

20. The computer-readable medium as recited in claim 16, wherein the second thread is created by a second program that injects the exception into the hung program module.

* * * * *